Patented Nov. 17, 1936

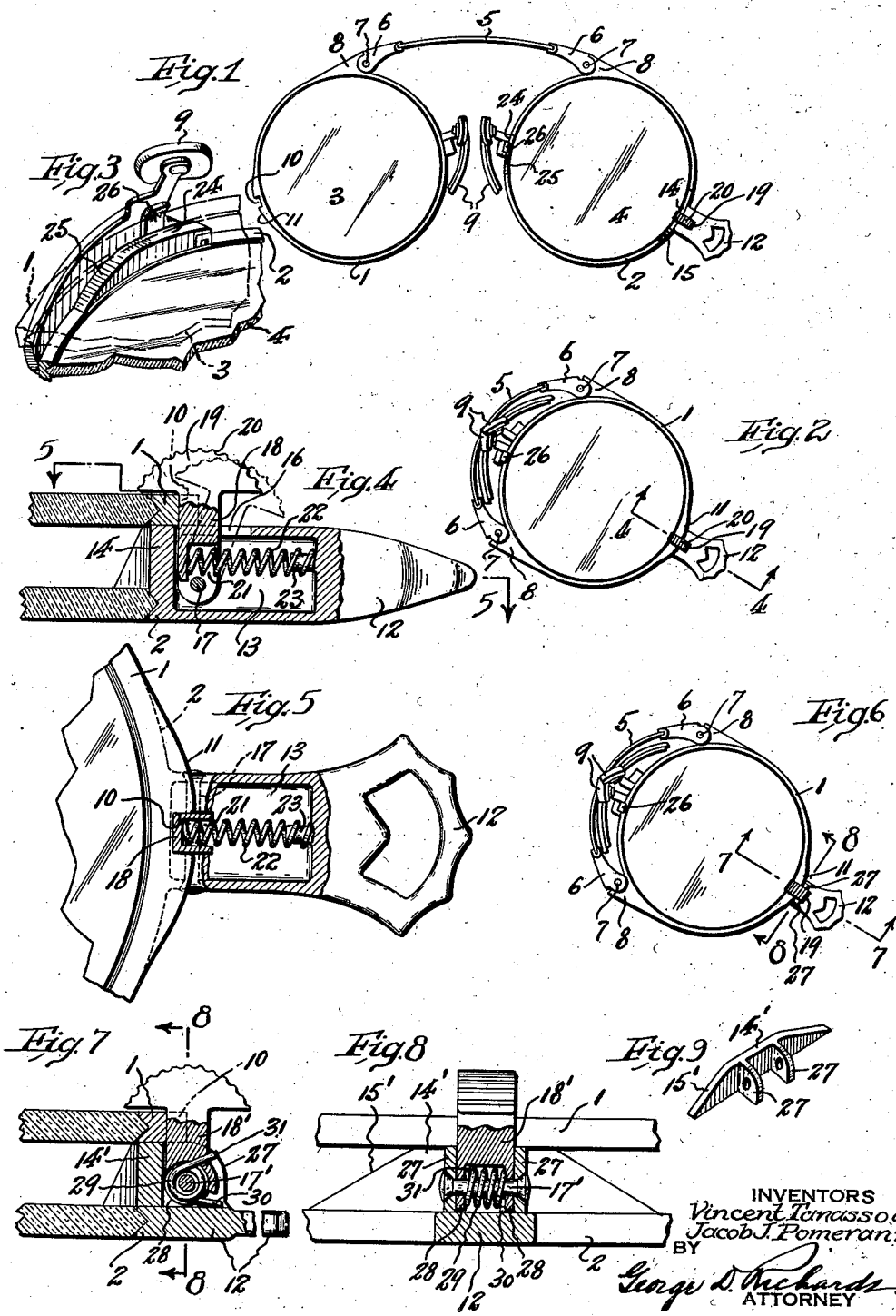

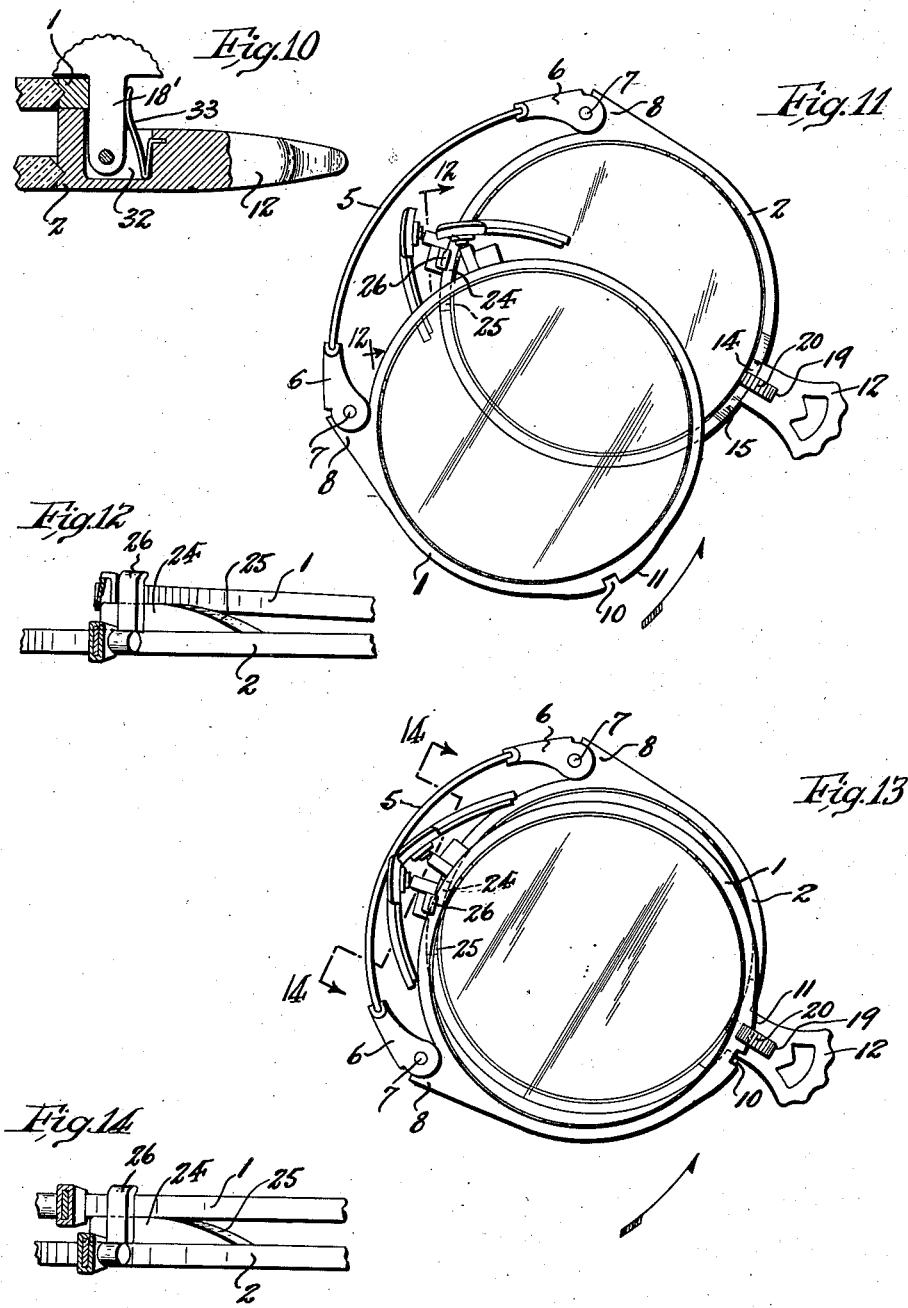

2,061,411

UNITED STATES PATENT OFFICE 2,061,411

FOLDING OXFORD EYEGLASSES

Vincent Tanasso, Harrison, and Jacob J. Pomeranz, Brooklyn, N. Y.

Application July 24, 1934, Serial No. 736,634

5 Claims. (Cl. 88—44)

This invention relates, generally, to improvements in eyeglass frames of the foldable type; and the invention has reference, more particularly, to improved means for releasably retaining such frames in folded condition.

This invention has for its principal object to provide a simple, durable and easily actuatable means for locking in and unlocking from folded condition a foldable eyeglass frame.

Another object of this invention is to provide a positive and secure releasable latching or locking means for foldable eyeglass frames, which is substantially free from risk of accidental release.

Another object of this invention is to provide releasable latching or locking means so devised as to support the rims of the frame when folded in such mutually spaced apart condition that the lenses supported thereby are not likely to rub together, with risk of scratching or other injury thereto, when folding and unfolding the frame as well as when the frame is locked in folded condition.

Still another object of the invention is to provide a releasable locking mechanism for foldable eyeglass frames which is compact and economical to manufacture and assemble; which is of very neat and sightly appearance; and which is strong and durable.

Other objects of this invention, not at this time more particularly enumerated, will appear in the following detailed description of the same.

Illustrative embodiments of the present invention are shown in the accompanying drawings, in which:—

Fig. 1 is an inside or rear face view of a foldable eyeglass frame having one form of the novel releasable locking means according to this invention, the frame being shown in its open or unfolded condition, and Fig. 2 is a similar view showing the frame in folded and locked condition.

Fig. 3 is a fragmentary perspective view, on a somewhat enlarged scale, showing certain lens-rim spacing and back-stop elements which are cooperative with the locking or latching means, the folded over lens and rim being shown in broken lines to avoid concealing said spacing and stop elements.

Fig. 4 is a vertical sectional view, drawn on an enlarged scale and taken on line 4—4 in said Fig. 2; and Fig. 5 is a horizontal sectional view, taken on line 5—5 in said Fig. 4.

Fig. 6 is a view similar to that of Fig. 2, but showing a modified form of the novel releasable locking means according to this invention; Fig. 7 is a vertical sectional view, drawn on an enlarged scale and taken on line 7—7 in Fig. 6; Fig. 8 is another enlarged sectional view, taken on line 8—8 in said Fig. 6; and Fig. 9 is an enlarged perspective view of the lens rim lift and latch bearing frame of said modified form of locking means.

Fig. 10 is a vertical sectional view similar to that of Fig. 7, but showing a modified form of spring means cooperative with the latching or locking device.

Fig. 11 is a rear face view of the eyeglass frame in an initial stage of folding movement thereof; and Fig. 12 is a fragmentary sectional view thereof, taken on line 12—12 in Fig. 11.

Fig. 13 is a rear face view of the eyeglass frame approaching the final stage of folding movement thereof and about to lock; and Fig. 14 is a fragmentary sectional view thereof, taken on line 14—14 in said Fig. 13.

Similar characters of reference are employed in the above described views, to indicate corresponding parts.

Referring to the drawings, there is shown thereby a pair of eyeglasses of the foldable or Oxford type, comprising a pair of rims 1 and 2 to support the respective lenses 3 and 4. Connecting said rims between their upper margins is a spring bridge 5, the same being joined at its respective ends to the respective rims by hinge connections comprising yokes 6 pivotally coupled by pintles 7 to abutments or knuckles 8 having cooperating stop shoulders to limit upward pivotal movement of the rims relative to the ends of the bridge. Suitably mounted on opposed lateral portions of the rims 1 and 2 are nose-guard elements 9, as is customary.

One of the rims, as e. g. the rim 1, is provided on an outer lateral portion of its periphery with a keeper-notch 10, having on at least one side thereof, to with the leading side relative to the folding movement of the rim 1 toward the rim 2, an inclined shoulder or cam portion 11 more or less tangent to the rim periphery.

The other rim, as e. g. the rim 2, is provided on an outer lateral portion of its periphery with a finger piece or handle 12 projecting radially therefrom in a plane parallel to the plane of the rim and its lens. Associated with said finger piece or handle is a novel manipulatable latch or locking means which is cooperative with the keeper notch 10 of rim 1.

In one embodiment of the manipulatable latch or locking means, as shown in Figs. 1 to 5 inclusive, and as related to the finger piece or handle 12, the body of the latter, intermediate its free end and the juncture thereof with rim 2, is formed to provide a hollow chamber 13. Affixed to the rear face of rim 2, and abutting and also affixed preferably to the inner end of the finger piece or handle body, is a spacer shoulder 14 which is provided at least at one end thereof, to wit the end toward which the rim 1 moves when the frame is folded, with an upwardly inclined lift cam 15 extending between the rear face plane of rim 2 to the top of said spacer shoulder 14. Provided in the top wall of the hollow body of said finger piece or handle 12 is a longitudinal slot 16. Mounted in and extending between the side walls of the hollow body of said finger piece or handle 12, and transversely through the chamber 13 adjacent the inner end of the latter, is a fulcrum pin or bar 17. Pivoted by its lower end on said fulcrum pin or bar 17 is an upstanding latch or lock lever 18, adapted for swinging movement in vertical plane toward and from said spacer shoulder 14. The upper free end of said latch or lock lever projects exteriorly from said chamber 13 through the slot 16, and formed at the extremity of said lever is an arcuate thumb button or head 19, the peripheral surface of which is provided with serrations 20 or other suitable means for roughening the same to assure nonslipping engagement thereof by the thumb when manipulated. Preferably the lower or inner end of said latch or lock lever is chambered to provide a hollow seat or socket 21 to receive the end of a compression spring 22, which spring is housed within the chamber 13, with its anchored end engaged upon a stud 23 projecting from the outer end wall of said chamber 13 against which the spring thrusts or is purchased. The spring 22 yieldably thrusts the latch or lock lever to latching position.

When folding the eyeglass frame, the rim 1 and its lens is swung downwardly and over the rear face of the rim 2 and its lens (see Figs. 11 and 13, thus carrying the keeper notch 10 of the former toward the latching or locking means of the latter. As rim 1 approaches folded position, it is engaged by the lift cam 15, up which it rides onto the spacer shoulder 14, thus preventing the opposed surfaces of lenses 3 and 4 from contacting and sliding one on the other with risk of scratching or other injury. As the keeper notch 10 of rim 1 approaches the latch or lock lever 18, the cam portion 11 engages the latter, thereby swinging outwardly the same against the tension of spring 22, until the keeper notch 10 is aligned or registered with said lever, whereupon the tension of said spring 22 swings inwardly said lever so that the same enters the keeper notch 10, to thereby lock the rims and their lenses in folded together condition. Means are provided both to aid in spacing the folded rims and their lenses against contact, when moving to folded condition and when in such condition, as well as to stop rim 1 from accidental backing away from locked folded relation to rim 2. In preferred form this means comprises a spacer shoulder 24, which is affixed to the rear face of rim 2 at a point more or less diametrically opposite the location of the spacer shoulder 14 and associated lock and handle means. This spacer shoulder 24 is provided, at the end thereof toward which the rim 1 moves when the frame is folded, with an upwardly inclined lift cam 25 extending between the rear face plane of rim 1 to the top of said spacer shoulder 24. Affixed to the outer side of said spacer shoulder 24, and having a free end portion projecting above the top of the latter, is a stop projection or lug 26. When folding the eyeglass frame, as the rim 1 and its lens moves over rim 2 and its lens, the former engages and moves over the lift cam 25, up which it rides onto the spacer shoulder 24, thus cooperating with the heretofore described spacer shoulder 14 in preventing contact between the opposed surfaces of the lenses 3 and 4. As rim 1 moves onto said spacer shoulder 24 it also moves behind and abuts said stop projection or lug 26, so that when the keeper notch 10 is engaged by the latch or lock lever 18, said rim 1 can not be shifted away from the latter so as to accidentally release the keeper notch 10 from engagement therewith. From the above it will be obvious that a very secure and positive locking of the rims 1 and 2 in folded together condition is attained.

When the frame is in folded and locked condition, it is a very simple and easy matter to release the same so that expansion of the spring bridge 5 will carry the rims and their lenses to opened out operative position ready for application to the user's eyes. This is done by grasping the finger piece or handle 12 between the finger and thumb, and then by means of the thumb drawing against the thumb button or head 19 outwardly swinging the latch or lock lever 18 to withdraw the same out of the keeper notch 10 of rim 1, whereupon the stored tension of the spring bridge 5 will spread the rims 1 and 2 to open or unfolded condition ready for use.

Referring now to Figs. 6 to 9 inclusive, there is shown therein a somewhat modified form of the latching or locking mechanism which embodies the principles of this invention. In this form the body of the finger piece or handle 12 approximates in thickness the thickness of the rim 2, and affixed to the rim 2 and said finger piece or handle body 12 is a fixture comprising a piece upstanding from the rear surface of rim 2 and adapted to provide a spacer shoulder 14'. This spacer shoulder 14' is provided at least at one end thereof, to wit the end toward which the rim 1 moves when the frame is folded, with an upwardly inclined lift cam 15' extending between the rear face plane of rim 2 to the top of said spacer shoulder 14'. Affixed to said spacer shoulder 14', to project outwardly from the outer side thereof, are a pair of laterally spaced apart perforate bearing ears 27. Mounted in and extending transversely between said bearing ears 27 is a fulcrum pin or bar 17'. Pivoted by its lower end on said fulcrum pin or bar 17' is an upstanding latch or lock lever 18', adapted for swinging movement in vertical plane toward and from said spacer shoulder 14'. Said lever 18' is provided at its upper free end with a thumb button or head 19'. The lower end of said lever 18' is of bifurcate or forked form to provide laterally spaced knuckle lugs 28 which pivotally embrace said fulcrum pin or bar 17'. Coiled around said pin or bar 17', between said knuckle lugs 28 is a torsional spring 29, one terminal arm 30 of which is purchased against the finger piece or handle 12, and the other terminal arm 31 of which tensionally thrusts inwardly against the lever 18', thereby yieldingly holding the same in its latching or locking position. It will be obvious that the modified structure above described functions and is manipulated in the same manner as already set forth in connection with the first described construction; but that, from the mechanical and production standpoint is somewhat simpler and easier to produce and assemble, while at the same time being of less bulky and consequently perhaps of more pleasing appearance.

In Fig. 10 there is shown another modification of the latching or locking mechanism which is substantially the same as that immediately above described, except that the finger piece or handle 12 is somewhat thicker so as to permit of the provision of a socket 32 therein to receive the pivoted end of the latch or lock lever 18', and so as to house the fixed or anchored end of a leaf type spring 33 for pressing the lever to latching or locking position, which type of spring is used in place of either the coil spring 22 or torsional spring 29 above described.

As other changes than those pointed out could be made in the described constructions, and many apparently widely different embodiments of this invention could be made without departing from the scope thereof as defined in the following claims, it is intended that all matter contained in the above description or shown in the accompanying drawings shall be interpreted as illustrative and not in a limiting sense.

We claim:—

1. In eyeglass frames of the foldable type having a pair of rims interconnected by means adapted to permit them to move together into folded relation with one overlying the other and including spring means tending to unfold them to normal useful position, a handle projecting outwardly from the periphery of one rim, an upstanding spacer shoulder affixed to said rim at the juncture of said handle therewith, said shoulder having a lift cam portion leading from the plane of the rim to the top of said shoulder, an upstanding latch lever, means for pivotally connecting said latch lever in association with said handle and so as to normally abut the outer side of said shoulder, spring means for yieldingly holding said latch lever in normal upstanding latching position, means on the periphery of the other rim to provide a keeper notch into which said lever is yieldingly thrust by its spring when said rims are folded together and said last mentioned rim is supported by said spacer shoulder, said latter means including a cam portion cooperative with said lever to retract the same until aligned with said keeper notch, a second upstanding spacer shoulder affixed to said first mentioned rim at a point substantially diametrically opposite said first mentioned spacer shoulder, said second shoulder having a lift cam portion leading from the plane of the rim to the top thereof, said spacer shoulders serving to space apart said rims when folded one over the other, and a stop projection associated with said second spacer shoulder to engage and back the folded rim against shifting out of its locked relation.

2. In a foldable eyeglass frame, the rims of which are movable to lie one over the other, a handle projecting from the periphery of one rim, a pivoted releasable latch means associated with said handle, latch receiving means on the periphery of the other rim, one rim having spacer means thereon at substantially diametrically opposite points adapted to support and space the superposed rim therefrom, and said first mentioned rim having stop means projecting transversely to the face plane thereof to engage the periphery of the superposed rim at a point substantially opposite its latched engagement with said latch means.

3. In foldable eyeglass frames, spring bridge connected rims which are foldable to lie one over the other, one rim having a handle projecting from its periphery, an upstanding spacer shoulder affixed to the rear surface of the latter rim adjacent to said handle, said spacer shoulder having an inclined end portion extending between its top and said rim surface up which the superimposed rim will ride onto said shoulder to space the rims apart when the same are folded together, and said spacer shoulder having a pair of laterally spaced perforate bearing ears projecting from its outer side for pivotally mounting a releasable latch means operative to hold said rims in folded together relation, a second spacer shoulder on said first mentioned rim at a point opposite said first mentioned shoulder, and a stop projection associated with said second spacer shoulder to engage and back the folded and latched rim against shifting horizontally.

4. In foldable eyeglass frames, spring bridge connected rims which are foldable to lie one over the other, an upstanding spacer shoulder affixed to the rear surface of one rim at a point substantially diametrically opposite to a handle and latch means carried thereby, said spacer shoulder having an inclined end portion extending between its top and said rim surface up which the superimposed rim will ride onto said shoulder to space the rims apart when the same are folded together, and said shoulder having at its side an upstanding stop projection extending above its top to engage the periphery of the superimposed rim to retain the same against shifting relative to its folded and latched relation to said first mentioned rim.

5. In eyeglass frames of the folded type having a pair of rims interconnected by means adapted to permit them to move together into folded relation one overlying the other and including spring means tending to unfold them to normal useful position, a handle projecting outwardly from the periphery of one rim, an upstanding spacer shoulder affixed to said rim adjacent to the handle, a spring controlled pivoted upstanding latch lever connected with said handle, means on the periphery of the other rim to provide a keeper notch engageable by said latch lever and adapted to hold the latter rim when folded and latched against shifting horizontally in transverse direction, said latch lever having means at its free end to overhang the folded and latched rim thereby to hold said rim against vertical displacement from said spacer shoulder, a second upstanding spacer shoulder affixed to said first mentioned rim at a point substantially diametrically opposite said first mentioned spacer shoulder, and a stop projection associated with said second spacer shoulder to engage and back the folded and latched rim against shifting horizontally in longitudinal direction, said stop projection having an inwardly curved free end to overhang the folded and latched rim thereby to hold the same against vertical displacement from said second spacer shoulder.

VINCENT TANASSO.
JACOB J. POMERANZ.